United States Patent
Shen et al.

(10) Patent No.: US 11,481,657 B2
(45) Date of Patent: Oct. 25, 2022

(54) CONTENT RECOMMENDATION METHOD, APPARATUS AND SYSTEM

(71) Applicant: Alibaba Group Holding Limited, George Town (KY)

(72) Inventors: Shixing Shen, Beijing (CN); Biyao Wang, Beijing (CN); Yuzong Yin, Beijing (CN); Jian Yao, Beijing (CN); Baiyu Pan, Beijing (CN); Ji Wang, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 1261 days.

(21) Appl. No.: 15/759,902

(22) PCT Filed: Sep. 19, 2016

(86) PCT No.: PCT/CN2016/099365
§ 371 (c)(1),
(2) Date: Mar. 14, 2018

(87) PCT Pub. No.: WO2017/156995
PCT Pub. Date: Sep. 21, 2017

(65) Prior Publication Data
US 2018/0240030 A1   Aug. 23, 2018

(30) Foreign Application Priority Data
Mar. 18, 2016   (CN) .......................... 201610158871.5

(51) Int. Cl.
*G06N 3/08* (2006.01)
*G06N 7/00* (2006.01)
(Continued)

(52) U.S. Cl.
CPC ............. *G06N 7/005* (2013.01); *G06F 16/00* (2019.01); *G06F 16/9535* (2019.01); *H04N 21/258* (2013.01); *H04L 67/01* (2022.05)

(58) Field of Classification Search
CPC ...... G06N 7/005; G06N 20/00; G06N 3/0454; G06N 3/08; G06N 16/48; G06F 16/22; G06F 9/4416
See application file for complete search history.

(56) References Cited

U.S. PATENT DOCUMENTS

2004/0040040 A1   2/2004   Danker
2013/0290339 A1*  10/2013  LuVogt ............... G06F 16/9535
                                                707/E17.089
(Continued)

FOREIGN PATENT DOCUMENTS

CN         102043781 A      5/2011
CN         103309866        9/2013
(Continued)

OTHER PUBLICATIONS

Translation of international Search Report dated Nov. 30, 2016, from corresponding PCT/CN2016/099365, 2 pages.
(Continued)

*Primary Examiner* — Michael J Huntley
*Assistant Examiner* — Sung W Lee
(74) *Attorney, Agent, or Firm* — Lee & Hayes, P.C.

(57) ABSTRACT

The present disclosure relates to a content recommendation method, device and system. The method includes: recommending a content in a content set to a user based on an average recommendation probability; collecting feedback information on the recommended content from the user's client, wherein the feedback information includes display information and click information, the display information including displaying times and displaying timing of the
(Continued)

```
┌─────────────────────────────────────────────────────────────────┐
│ determining a content having the highest attention degree among │
│ contents of which the displaying times exceed a predetermined   │ ── 301
│ threshold                                                        │
└─────────────────────────────────────────────────────────────────┘
                                 ↓
┌─────────────────────────────────────────────────────────────────┐
│ assigning a specified recommendation probability to a content of│
│ which the displaying times are less than the threshold,          │
│ subtracting a sum of all specified recommendation probabilities  │ ── 302
│ from 1, setting the result as a preferable recommendation        │
│ probability, and assigning the preferable recommendation         │
│ probability to the content having the highest attention degree   │
└─────────────────────────────────────────────────────────────────┘
                                 ↓
┌─────────────────────────────────────────────────────────────────┐
│ selecting one content from the content having the highest        │
│ attention degree and the content of which the displaying times   │
│ are less than the threshold using the roulette wheel selection   │ ── 303
│ algorithm based on the specified recommendation probability and  │
│ the preferable recommendation probability, as a first preferred  │
│ content in the sequence of preferred contents                    │
└─────────────────────────────────────────────────────────────────┘
``` recommended content on the client, and the click information including clicking times and clicking timing of the recommended content on the client; and determining a sequence of preferred contents from the contents in the content set according to the feedback information, so as to recommend a content to the user based on the sequence of preferred contents. Respective aspects of the present disclosure recommend contents based on a user's feedback so that it is possible to perform reasonable and effective content recommendation for random users who have less click behaviors.

20 Claims, 4 Drawing Sheets

(51) Int. Cl.
*H04N 21/258* (2011.01)
*G06F 16/9535* (2019.01)
*G06F 16/00* (2019.01)
*H04L 67/01* (2022.01)

(56) References Cited

U.S. PATENT DOCUMENTS

| | | | | |
|---|---|---|---|---|
| 2014/0136554 | A1* | 5/2014 | Moradi | G06F 16/435 707/754 |
| 2014/0280120 | A1* | 9/2014 | Sharp | G06F 16/24578 707/732 |
| 2015/0213368 | A1 | 7/2015 | Yao et al. | |
| 2015/0269488 | A1* | 9/2015 | Galai | G06Q 30/02 706/11 |

FOREIGN PATENT DOCUMENTS

| | | | | |
|---|---|---|---|---|
| CN | 104268187 | | 1/2015 | |
| CN | 104268187 A | * | 1/2015 | ....... G06F 17/30867 |
| CN | 105872629 | | 8/2016 | |

OTHER PUBLICATIONS

Translation of Office Action dated Jan. 8, 2019, from corresponding CN Patent Application No. 201610158871.5, 14 pages.
Translation of Office Action dated Mar. 26, 2019, from corresponding CN Patent Application No. 201610158871.5, 5 pages.
Translation of Search Report dated Apr. 11, 2018, from corresponding CN Patent Application No. 2016101588715, 1 page.
Translation of Supplemental Search Report dated Dec. 27, 2018, from corresponding CN Patent Application No. 2016101588715, 1 page.
Translation of Written Opinion dated Nov. 30, 2016, from corresponding PCT/CN2016/099365, 7 pages.
Office Action dated Nov. 16, 2018, from corresponding EP Patent Application No. 16894154, 5 pages.
Office Action dated Jul. 26, 2019, from corresponding EP Patent Application No. 16894154, 6 pages.
Search Report dated Sep. 28, 2018, from corresponding EP Patent Application No. 16894154, 2 pages,.

* cited by examiner

CONTENT RECOMMENDATION METHOD, APPARATUS AND SYSTEM

CROSS-REFERENCE TO RELATED APPLICATION

This application is the national stage, under 35 USC 371 of PCT application PCT/CN2016/099365, filed Sep. 19, 2016 and claims priority from CN Patent Application No. CN201610158871.5, filed on Mar. 18, 2016, the entire contents of which are incorporated herein by reference.

TECHNICAL FIELD

The present disclosure relates to the field of Internet technology, and more particularly, to a content recommendation method, device and system.

BACKGROUND

For a network platform that provides users with a variety of content such as video, audio, and advertisement, a focus of their research is how to effectively anticipate user's needs so as to recommend content that may be of interest to the user. The existing methods usually extract information reflecting the user's preference, such as the user's interest tags, from the user's historical click data, to perform content recommendation. However, for random users who account for the majority of the users, they conduct a very small amount of clicking operations, and the information included in the historical click data is insufficient, so it can be difficult to carry out recommendation by the above-mentioned methods.

SUMMARY

In one aspect, in general, the present disclosure describes a content recommendation method and device, which are capable of recommending content based on a user's feedback so that it is possible to perform reasonable and effective content recommendation for random users who have less click behaviors.

According to one aspect of the present disclosure, there is described a content recommendation method, comprising: recommending a content in a content set to a user based on an average recommendation probability; collecting feedback information on the recommended content from the user's client; and determining a sequence of preferred contents from the contents in the content set according to the feedback information, so as to recommend a content to the user based on the sequence of preferred contents.

According to another aspect of the present disclosure, there is described a content recommendation method, comprising: creating a content pool which comprises a plurality of content sets each containing contents of corresponding type, respectively; and executing the method in the above aspect on the respective content sets in the content pool, to generate sequences of preferred contents for the respective content sets.

According to another aspect of the present disclosure, there is described a content recommendation device comprising: a first recommendation unit configured to recommend a content in a content set to a user based on an average recommendation probability; a collection unit configured to collect feedback information on the recommended content from the user's client; and a determination unit configured to determine a sequence of preferred contents from the contents in the content set according to the feedback information, so as to recommend a content to the user based on the sequence of preferred content.

According to another aspect of the present disclosure, there is described a content recommendation device comprising: a creation unit configured to create a content pool which comprises a plurality of content sets each containing contents of corresponding type, respectively; and a sequence generation unit configured to operate the content recommendation device in the above aspect on the respective content sets in the content pool, to generate sequences of preferred contents for the respective content sets.

According to another aspect of the present disclosure, there is described a content recommendation system comprising: a server apparatus which is provided with the content recommendation device in the above aspects; and a client apparatus which comprises: an information collection unit configured to collect the feedback information; an information transmission unit configured to transmit the feedback information to the server apparatus; a sequence storage unit configured to store the sequence of preferred contents from the server apparatus; and a content recommendation unit configured to recommend a content to the user based on the sequence of preferred contents.

Respective aspects of the present disclosure recommend contents based on a user's feedback so that it is possible to perform reasonable and effective content recommendation for random users who have less click behaviors.

Additional features and aspects of the present disclosure will become apparent from the following description of exemplary examples with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
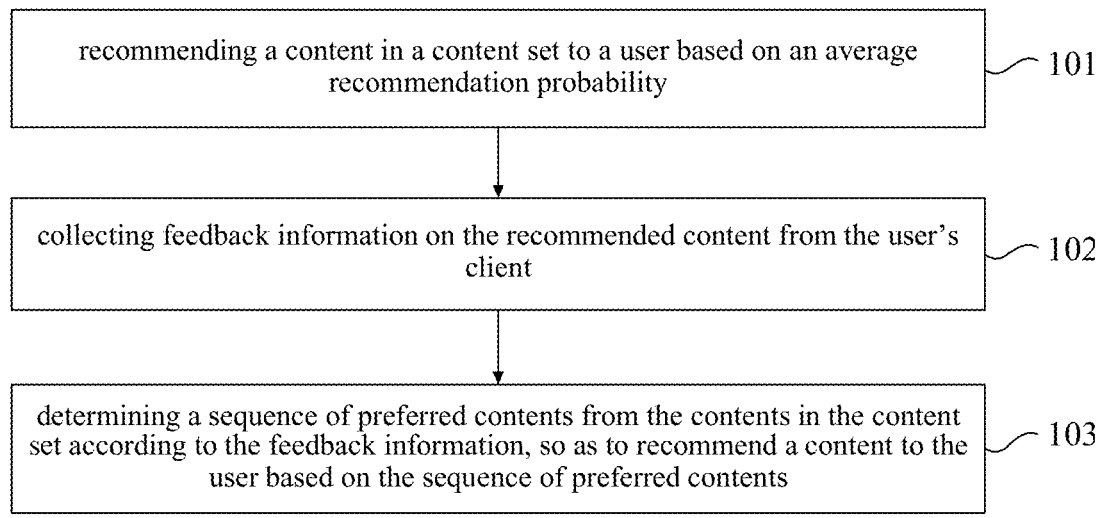
FIG. 1 shows a flowchart of a content recommendation method according to one embodiment of the present disclosure.

Various exemplary examples, features and aspects of the present disclosure will be described in detail with reference to the drawings. The same reference numerals in the drawings represent parts having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples.

Numerous details are given in the following examples for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure become apparent.

Embodiment 1

FIG. 1 shows a flowchart of a content recommendation method according to one embodiment of the present disclosure. The embodiment can be implemented in a server. As shown by FIG. 1, the method mainly comprises:

Step 101 of recommending a content in a content set to a user based on an average recommendation probability;

Step 102 of collecting feedback information on the recommended content from the user's client;

Step 103 of determining a sequence of preferred contents from the contents in the content set according to the feedback information, so as to recommend a content to the user based on the sequence of preferred contents.

This embodiment recommends contents based on a user's feedback so that it is possible to perform reasonable and effective content recommendation for random users who have less click behaviors.

The term "content set" herein refers to a set formed by a plurality of contents, and the contents in the same content set may have the same type, for example, one of video, audio and advertisement. The contents in the content set may be contents which are manually selected, or contents which are selected according to certain rules and have possibility of being recommended to the user, for example, videos popular in a period of time, new videos just released, etc. The present disclosure does not intend to set any restriction thereon. The content set can be stored and maintained in a server, and the contents therein can be regularly updated.

The term "user" herein can be all types of users in a broad sense, or users of a specific type, for example, a user who has been selected according to certain rules and particularly interested in a particular type of contents, or a random user who has been determined to have a small number of historical clicks. The present disclosure does not intend to set any restriction thereon.

The term "recommendation probability" of some content herein refers to a probability that the content is recommended when a content in the content set is randomly selected and recommended. A sum of the recommendation probabilities of all contents in the content set is 1. For example, assuming that there are 100 contents in the content set, the average recommendation probability for each content is 1/100.

In the following, detailed exemplary embodiments of respective steps of the Embodiment are described in detail with reference to specific examples, and it should be understood by those skilled in the art that these specific embodiments only facilitate understanding but do not limit the disclosure in any way.

1. Step 101 of recommending a content in a content set to a user based on an average recommendation probability Step 101 can be deemed as a process of "initialization." When there is no sufficient user feedback after the content set has just been created or updated, content in the content set can be recommended to a user according to the average recommendation probability, so as to obtain subsequent feedback information through display and click of these contents. Step 101 can be executed within a predetermined time period, such as 5 seconds, since the method is executed. After the predetermined time period lapses, step 101 may not be executed any longer, and only subsequent steps 102 and 103 are executed in real time instead.

Figure 2:
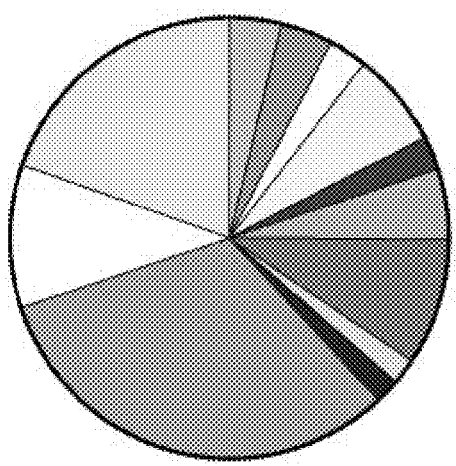
FIG. 2 shows a diagram of the principle of roulette wheel selection algorithm.

In one example, recommendation based on the average recommendation probability can be realized by roulette wheel selection algorithm. FIG. 2 shows a diagram of the principle of roulette wheel selection algorithm. Wherein, each sector in the circle represents the probability that each content is recommended, and a sum of all the probabilities is 1. A content will be selected when the roulette is rotated. The probability that a content in a larger sector (namely, a higher recommendation probability) is selected is larger, and on the contrary, the probability that a content in a smaller sector (namely, a lower recommendation probability) is selected is lower. In step 101, recommendation is performed according to the average recommendation probability, that is, sectors corresponding to each content have the same area, and the probability of being selected is equal.

One exemplary embodiment of performing recommendation using roulette wheel selection algorithm is as follows: each recommendation probability may be assigned with a corresponding numerical range. The above-mentioned 100 contents are still taken as an example. In the case of the average recommendation probability, the numerical range corresponding to each content may be the same, for example, the first content corresponds to a numerical range of 1 to 2, the second content corresponds to a numerical range of 3 to 4, . . . the $100^{th}$ content corresponds to a numerical range of 199 to 200, which is equivalent to dividing the circle of FIG. 2 into 100 sectors of the same area. A random number between 1 to 200 is generated (equivalent to rotating the roulette), and when the random number falls within some numerical range, it is equivalent to that the corresponding content is selected, and this content can be recommended to the user.

Step 101 may be regularly performed, for example, recommendation may be performed by executing roulette wheel selection algorithm at a certain time interval. Step 101 may also be performed in response to a request from the user. For example, within a predetermined time period, such as 5 seconds, since the method is executed, a request may be sent to the server at an appropriate timing whenever a user logs in to a network platform through the client or opens a specific web page on the network platform. In response to this request, the server may execute recommendation once (namely, the roulette is rotated once), so as to recommend one content in the content set to the user.

After step 101 is executed, information of the recommended content, such as links, content ID, abstract, etc. will be displayed on the client of the user, and the user can watch or listen to the content by clicking the information via the client and generate feedback information.

2. Step 102 of collecting feedback information on the recommended content from the user's client In one example, the feedback information may include information about content interactions including display information and click information. The display information includes: displaying frequency (i.e., a quantity of display times, or occurrences, within a time period), also referred to herein as "displaying times" of the recommended content on the client (i.e., how many times the recommended content has been displayed on the client, for example, how many times a link of some video has appeared on the interface of the client); and displaying timings of the recommended content on the client (i.e., when the recommended content was displayed each time, or occurrence). The click information includes: clicking frequency (i.e., a quantity of clicking times, or occurrences, within a time period), also referred to herein as "clicking times" of the recommended content on the client (i.e., how many times the recommended content has been clicked on the client) and clicking timings of the recommended content on the client (i.e., when the content was clicked each time, or occurrence).

The feedback information may be collected by the client of the user, and then forwarded to the server from respective clients. In the server, the feedback information may be stored in a unified message queue and processed by multi-threading. The feedback information may be stored in a video feedback object.

Collection of the feedback information here may be continuous and real-time collection during the process of executing the method. Once the feedback information is generated in the client, the client collects it and transmits it to the server immediately, or transmits it to the server after buffering so as to reduce the processing pressure of the server. This collection makes subsequent recommendation independent of the historical click data but dependent on real-time feedback from the user, thereby realizing recommendation for random users who have insufficient historical click data.

3. Step 103 of determining a sequence of preferred contents from the contents in the content set according to the feedback information Step 103 may be regularly performed, that is, a sequence of preferred contents is regularly determined at a certain time interval. It may also be performed in response to a request from the user, that is, the client may send a request to the server at an appropriate timing whenever a user logs in to a network platform through the client or opens a specific web page on the network platform. In response to this request, the server can determine a sequence of preferred contents from the contents in the content set according to the collected feedback information as described above.

In one example, considering that the user's feedback information may have characteristics such as having a long delay, having a specific effective time period, the collected feedback information may be processed by a method using time window. For example, statistical processing may be performed on the feedback information of which the displaying timing and clicking timing are within a predetermined time period, to determine a sequence of preferred contents. Wherein, the predetermined time period may be selected according to the needs of statistical processing, characteristics of the user's feedback, features of the contents, etc. The present disclosure does not intend to set any restriction thereon. For example, if the content is real-time hot news, half an hour may be set as the predetermined time period, and accordingly step 103 may be performed every half hour. Besides, the predetermined time period may be a period of time forward taking the current timing (e.g., the timing of receiving the user's request) as a starting point.

The sequence of preferred contents can be determined based on the feedback information within the predetermined time period. In the following, there is provided a detailed example of determining a sequence of preferred contents with reference to FIG. 3. In this example, the recommendation probabilities of respective contents in the content set are re-determined according to the feedback information; and a sequence of preferred contents is determined based on the re-determined recommendation probabilities using the roulette wheel selection algorithm.

Figure 3:
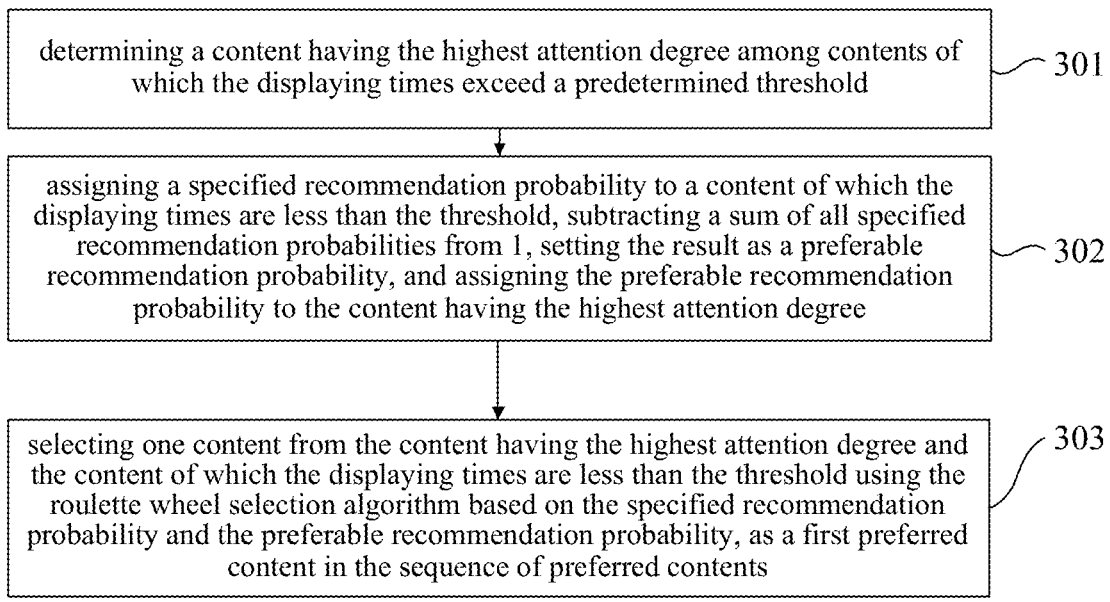
FIG. 3 shows a flowchart of an example of a process of determining a sequence of preferred contents according to feedback information.

FIG. 3 shows a flowchart of an example of a process of determining the sequence of preferred contents according to feedback information. This example performs the processing based on feedback information of which the displaying timing and clicking timing are within the predetermined time period, and mainly includes the following steps 301 to 303.

Step 301 comprises determining a content having the highest attention degree among contents of which the displaying times exceed a predetermined threshold, wherein the attention degree is associated with a ratio of the clicking times to the displaying times of the content.

For example, assuming that the predetermined threshold is 20 times (the specific value of the threshold can be determined as appropriate), five contents of which the displaying times within the predetermined time period exceeds the threshold are collected, i.e., A1, A2, A3, A4, A5, and attention degrees of the five contents can be calculated, respectively. The attention degree herein reflects the degree of being concerned by the user, or "hot degree". The attention degree may be a ratio of the clicking times to the displaying times (also called as click-through rate) of the content in the feedback information. Other factors may also be involved in the calculation of the attention degree, for example, original attribute information of the content which could reflect its hot degree, and this information may be manually assigned, or be obtained by performing statistical processing on the historical click-through rate of the content.

A content, such as A1, which has the highest attention degree among these five contents can be determined and is to be processed in subsequent steps.

Step 302 comprises assigning a specified recommendation probability to a content of which the displaying times are less than the threshold, subtracting a sum of all specified recommendation probabilities from 1, setting the result as a preferable recommendation probability, and assigning the preferable recommendation probability to the content having the highest attention degree.

This step serves to re-determine recommendation probabilities for respective contents, namely, the "area of sector" mentioned above, in preparation for performing the roulette wheel selection algorithm later.

For contents of which the displaying times are less than the threshold, it can be construed that this part of contents have not been "fairly treated" or have not been sufficiently displayed in the recommendation step based on the average recommendation probability in step 101. In order to compensate for it, these contents are also incorporated into the "roulette wheel" in step 302 and are assigned with a specified recommendation probability.

In one example, the specified recommendation probability may be the aforesaid average recommendation probability, as a relatively simple way. In another example, the specified recommendation probability may be a compensatory recommendation probability of the content. The "compensatory recommendation probability" could be obtained by subtracting an actual display probability of the content (namely, a ratio of the actual displaying times of the content to total displaying times of all the contents) from the average recommendation probability. That is, the compensatory recommendation probability is used to compensate for insufficient display of this part of contents. This manner is relatively complicated, but the compensation is more accurate.

Next, a sum of all specified recommendation probabilities is subtracted from 1, the result is set as a preferable recommendation probability, and the preferable recommendation probability is assigned to the content having the highest attention degree.

The above example is still taken to make illustration. Assuming that the predetermined threshold for the displaying times is 20 and that there are 20 contents of which the displaying times are less than the threshold, i.e., B1 to B20, then they respectively may be assigned with an average recommendation probability 1/100, and 1−20×1/100=0.8 is taken as a preferable recommendation probability and assigned to the above-selected content A1 having the highest attention degree. The recommendation probability for the other contents is 0.

Hence, 21 sectors are formed on the roulette wheel. Wherein, the one having the largest area corresponds to the content A1 which has the highest attention degree, and its area accounts for 80% of the total area of the roulette wheel. The rest 20 sectors correspond to B1 to B20, and the area of each sector accounts for 1% of the total area of the roulette wheel.

Step 303 comprises selecting one content from the content having the highest attention degree and the content of which the displaying times are less than the threshold using the roulette wheel selection algorithm based on the specified recommendation probability and the preferable recommendation probability, as a first preferred content in the sequence of preferred contents.

The principle of the roulette wheel selection algorithm is as described above. Steps 301 to 303 may be regularly performed to regularly generate the sequence of preferred contents. In an alternative manner, step 301 and step 302 may be regularly performed, and step 303 may be performed in response to a request of the user. Namely, recommendation probabilities of respective contents are re-determined regularly, and the roulette wheel formed in step 302 may be "rotated" once a request from the user (for example, a request issued by the client in response to that the user logs in to a network platform or opens a specific web page) is received. A first preferred content, for example, A1, can be obtained, and it is arrayed in the sequence of preferred contents. In another alternative manner, steps 301, 302, 303 may be performed in response to the request of the user.

The first preferred content may be directly recommended to the user who issued the request. Besides, in one example, this embodiment can avoid sending same content to the user repeatedly by means described below. A predetermined number of contents of which the attention degree is lower than the highest attention degree may be selected from the contents of which the displaying times exceed the predetermined threshold, as candidate contents. Assuming that the predetermined number is 4, then contents A2 to A5 are selected as candidate contents. The predetermined number may be selected as needed. These candidate contents may be randomly sorted after the first preferred content. For example, a sequence of preferred contents, A1, A3, A4, A2, A5 may be obtained in this manner; among them, A1 is the first preferred content, and A3, A4, A2, A5 are candidate contents randomly sorted. The server may transmit this sequence of preferred contents to the client, and the client may "filter" this sequence and find a content that has not been recommended to the user. For example, a content that is arranged at the front of the sequence of preferred contents and is not included in a list of contents that have been recommended to the user could be recommended to the user, and the information of the recommended content is added to the list of contents that have been recommended to the user later. For example, if content A1 has already been included in the list of contents that have been recommended to the user stored or obtained in the client (namely, content A1 has been recommended to the user), then A3, A4, A2, A5 in the sequence may be investigated in order until a content which is not included in the list of contents that have been recommended to the user is found, and this content is recommended to the user.

In one possible embodiment, a sequence of preferred contents may be regularly generated by the server and be provided to the client, and in response to the user's request, the client may select a content to be finally recommended to the user based on the process described above, so as to avoid repeated recommendation. Besides, the client may also cache the sequence of preferred contents from the server device. For example, when the user requests the client to recommend a content, if the cache module of the client is null, a request can be sent to the server device to obtain a sequence of preferred contents, and the cache timer is cleared. If the cache module of the client is not null and the cache timer exceeds a threshold, the server may be requested to update the data of the sequence of preferred contents.

Recommendation of a content to the user may be performed by displaying information of the content such as link (e.g., URL), content ID, abstract, etc. of the content in a manner of recommendation. The other contents in the sequence may also be displayed in a list to the user for the user's alternative choosing.

Embodiment 2

Figure 4:
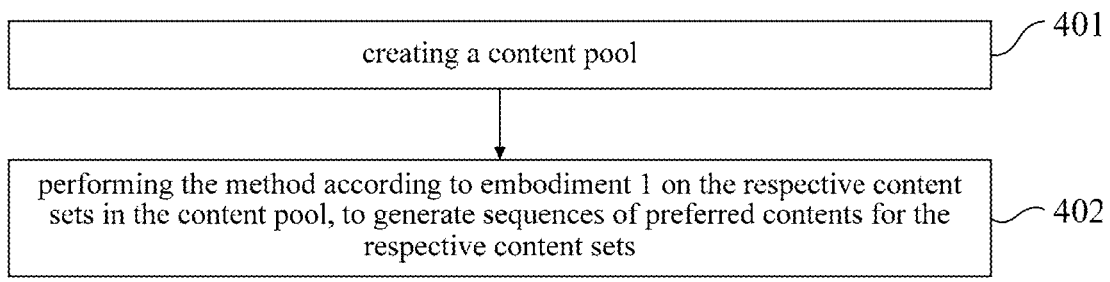
FIG. 4 shows a flowchart of a content recommendation method according to another embodiment of the present disclosure.

FIG. 4 shows a flowchart of a content recommendation method according to another embodiment of the present disclosure, and this embodiment may be implemented on a server side. As shown by FIG. 4, the method according to this embodiment mainly comprises: a step 401 of creating a content pool which comprises a plurality of content sets each containing contents of corresponding type, respectively; and a step 402 of performing the method according to embodiment 1 on the respective content sets in the content pool, to generate sequences of preferred contents for the respective content sets.

In this embodiment, the content pool may consist of a plurality of content sets, each of which may contain one type of contents. Classification may be made according to the type of service, for example, video contents in the first content set, advertisement contents in the second content set, and so on. The classification may also be made according to a more refined classification principle, for example, current news videos in the first content set, film and television videos in the second content set, and so on. The method according to embodiment 1 may be performed on the respective content sets, thereby independently generating sequences of preferred contents for the respective content sets.

The method may further comprise a step of managing the content pool, including operations such as determining whether a content pool exists, creating a content pool, setting valid time of the content pool, or loading objects of the content pool. The method may further comprise the operation of creating, retrieving, updating, and/or deleting on the content pool and expiration processing.

Embodiment 3

Figure 5:
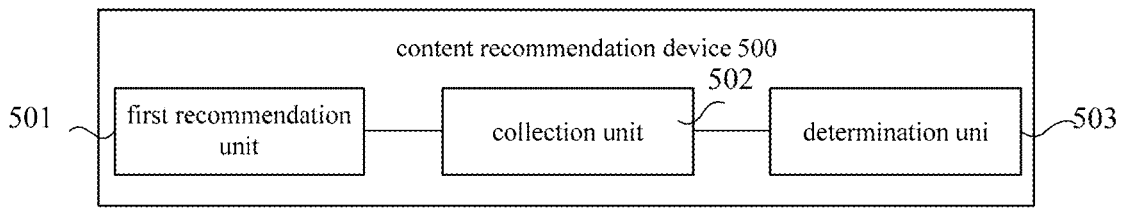
FIG. 5 shows a structural diagram of a content recommendation device according to another embodiment of the present disclosure.

FIG. 5 shows a structural diagram of a content recommendation device according to one embodiment of the present disclosure. The device of this embodiment may be disposed in a server apparatus. As shown by FIG. 5, a content recommendation device 500 mainly comprises: a first recommendation unit 501 configured to recommend a content in a content set to a user based on an average recommendation probability; a collection unit 502 configured to collect feedback information on the recommended content from the user's client; and a determination unit 503 configured to determine a sequence of preferred contents from the contents in the content set according to the feedback information, so as to recommend a content to the user based on the sequence of preferred contents.

This embodiment recommends contents based on a user's feedback so that it is possible to perform reasonable and effective content recommendation for random users who have less click behaviors.

In one example, the feedback information may include display information and click information. Wherein, the display information includes displaying times and displaying timings of the recommended content on the client, and the click information includes clicking times and clicking timings of the recommended content on the client.

In one example, the determination unit may comprise: a recommendation probability determination unit configured to re-determine recommendation probabilities of respective contents in the content set according to the feedback information; and a sequence determination unit configured to determine the sequence of preferred contents based on the re-determined recommendation probabilities using the roulette wheel selection algorithm.

In one example, the recommendation probability determination unit may comprise: a highest attention degree content determination unit configured to determine a content with the highest attention degree among contents of which the displaying times exceed a predetermined threshold, based on the feedback information of which the displaying timing and the clicking timing are within a predetermined time period, wherein the attention degree is associated with a ratio of the clicking times to the displaying times of the content; and a recommendation probability assigning unit configured to assign a specified recommendation probability to a content of which the displaying times are less than the threshold, subtract a sum of all specified recommendation probabilities from 1, set the result as a preferable recommendation probability, and assign the preferable recommendation probability to the content having the highest attention degree. The sequence determination unit may comprise: a selection unit configured to select one content from the content having the highest attention degree and the content of which the displaying times are less than the threshold using the roulette wheel selection algorithm based on the specified recommendation probability and the preferable recommendation probability, as a first preferred content in the sequence of preferred contents.

In one example, the specified recommendation probability may be the average recommendation probability. In another example, the specified recommendation probability may be a compensatory recommendation probability of the content, the compensatory recommendation probability being obtained by subtracting an actual display probability of the content from the average recommendation probability.

In one example, the sequence determination unit may further comprise: a candidate content selection unit configured to select a predetermined amount of contents of which the attention degree is lower than the highest attention degree among from contents of which the displaying times exceed the predetermined threshold, as candidate contents; and an arrangement unit configured to arrange the candidate contents after the first preferred content.

In one example, the arrangement unit may arrange the candidate contents after the first preferred content after randomly sorting the candidate contents.

In one example, contents in the content set may be one of video, audio and advertisements.

Embodiment 4

Figure 6:
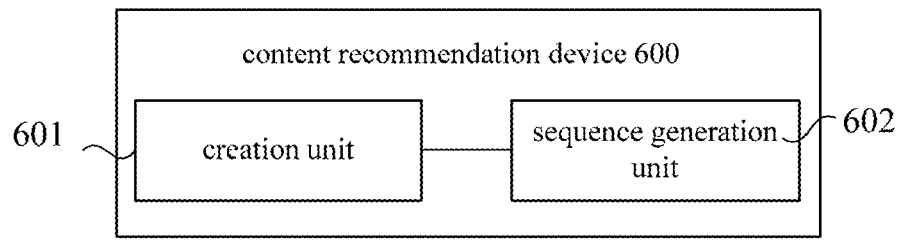
FIG. 6 shows a structural diagram of a content recommendation device according to another embodiment of the present disclosure.

FIG. 6 shows a structural diagram of a content recommendation device according to another embodiment of the present disclosure. The device of this embodiment may be disposed in a server apparatus. As shown by FIG. 6, a content recommendation device 600 mainly comprises: a creation unit 601 configured to create a content pool which comprises a plurality of content sets each containing contents of corresponding type, respectively; and a sequence generation unit 602 configured to operate the content recommendation device of embodiment 3 on the respective content sets in the content pool, to generate sequences of preferred contents for the respective content sets.

The device may further comprise a unit configured to manage the content pool, wherein, the management may include determining whether a content pool exists, creating a content pool, setting valid time of the content pool, or loading objects of the content pool. The device may further comprises a unit configured to perform the operation of creating, retrieving, updating, and/or deleting on the content pool and a unit configured to perform expiration processing.

Embodiment 5

Figure 7:
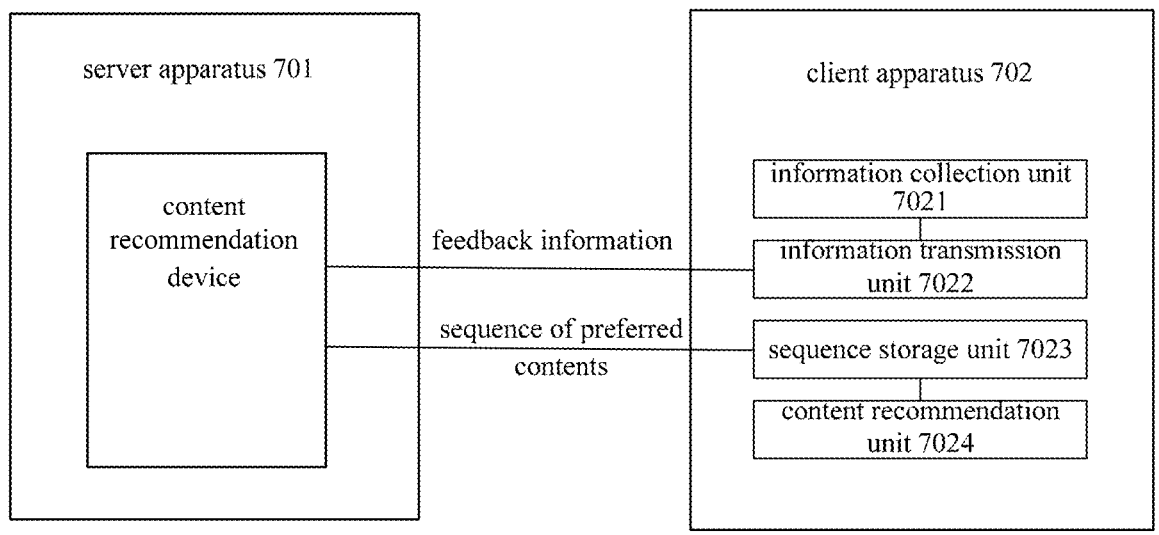
FIG. 7 shows a structural diagram of a content recommendation system according to another embodiment of the present disclosure.

FIG. 7 shows a structural diagram of a content recommendation system according to one embodiment of the present disclosure. As shown by FIG. 7, the system mainly comprises a server apparatus 701 and a client apparatus 702. The server apparatus 701 is provided with the content recommendation device according to embodiment 3 or 4. The client apparatus 702 comprises: an information collection unit 7021 configured to collect the feedback information; an information transmission unit 7022 configured to transmit the feedback information to the server apparatus; a sequence storage unit 7023 configured to store a sequence of preferred contents from the server apparatus; and a content recommendation unit 7024 configured to recommend a content to the user based on the sequence of preferred contents.

The client apparatus may be a terminal device such as a smartphone or a personal computer.

In one example, the content recommendation unit in the client apparatus may be configured to filter the sequence of preferred contents so as to avoid recommending same content repeatedly to the user. For example, the content recommendation unit may be configured to recommend to the user a content that is arranged at the front of the sequence of preferred contents and not included in a list of contents that have been recommended to the user, and then add information of the recommended content to the list of contents that have been recommended to the user.

In one example, the client apparatus may further comprises a cache unit configured to cache feedback information collected by the information collection unit and then transmit it to the server apparatus, so as to reduce the pressure on the server. For example, the cache unit may use a cache strategy as follows: if the current cache data in the cache unit exceeds a threshold, the feedback information is merged and then sent to the server apparatus, and the cache timer is cleared; if the current timing of the cache timer exceeds a threshold, the feedback information is merged and then sent to the server apparatus, and the cache timer is cleared. Since the amount of the feedback information would be up to 100,000 pieces per second, the pressure on the server can be effectively reduced by sending the feedback information after caching and merging it at first.

In one example, the sequence storage unit 7023 may comprise a cache unit configured to cache a sequence of preferred contents from the server apparatus. When the user requests the client to recommend a content, if the cache unit is null, a request can be sent to the server apparatus to obtain a sequence of preferred contents, and the cache timer is cleared; if the cache unit is not null and the cache timer exceeds a threshold, the server may be requested to update the data of the sequence of preferred contents.

In one example, the server apparatus 701 may further comprises a content pool management unit configured to manage the content pool, including determining whether a content pool exists, creating a content pool, setting valid time of the content pool, or loading objects of the content pool. The content pool management unit may be further configured to perform the operation of creating, retrieving, updating, and/or deleting on the content pool and expiration processing.

In the server apparatus, the feedback information may be stored in a unified message queue and processed by multi-threading. The feedback information may be stored in a video feedback object.

Embodiment 6

Figure 8:
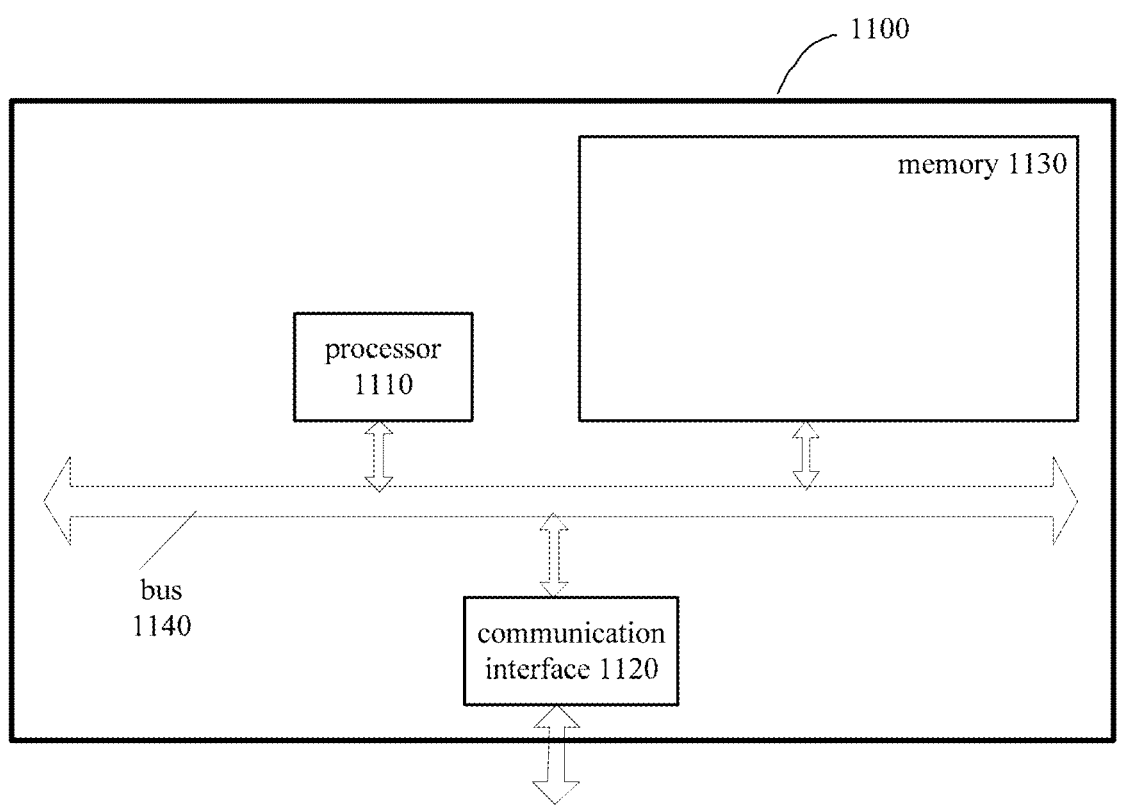
FIG. 8 shows a structural diagram of a content recommendation apparatus according to another embodiment of the present disclosure.

FIG. 8 shows a structural diagram of a content recommendation apparatus according to another embodiment of the present disclosure. The content recommendation apparatus 1100 may be a host server with a computing capability, a personal computer PC, or a portable computer or terminal that can be carried. The detailed embodiments of the present disclosure do not limit the specific implementation of the computing node.

The content recommendation apparatus 1100 comprises a processor 1110, a communication interface 1120, a memory 1130 and a bus 1140. Wherein, communication among the processor 1110, the communication interface 1120 and the memory 1130 is accomplished via the bus 1140.

The communication interface 1120 is configured to communicate with network devices which include, for example, a virtual machine management center, shared memories, etc.

The processor 1110 is configured to execute programs. The processor 1110 may be a central processing unit CPU, or ASIC (Application Specific Integrated Circuit), or one or more integrated circuits configured to carry out the embodiments of the present disclosure.

The memory 1130 is configured to store files. The memory 1130 may comprise a high-speed RAM memory, and may also comprise a non-volatile memory, for example, at least one disk memory. The memory 1130 may also be a memory array. The memory 1130 may also be partitioned, and the blocks may be combined into a virtual volume according to certain rules.

In one possible embodiment, the aforesaid program may be a program code including a computer operation instruction. The program may be configured to implement respective steps of the method according to embodiment 1 or 2.

One skilled in the art would appreciate that the respective exemplary units and algorithm steps in the embodiments described herein can be implemented by electronic hardware, or by the combination of computer software and electronic hardware. Whether these functions are implemented by hardware or software depends on the specific application and design constraints of the technical solution. Persons skilled in the art may select a different method for a particular application to implement the described functions, but such implementation should not be deemed to go beyond the scope of the present disclosure.

If the functions are implemented in the form of computer software and sold or used as stand-alone products, it is considered, to some extent, that all or a part of the technical solution of the present disclosure is reflected in the form of computer software products. The computer software products usually are stored in a computer-readable, non-volatile storage medium, including a number of instructions for enabling a computer device, which may be a personal computer, a server, or a network device, etc., to execute all or a part of steps the methods according to respective embodiments of the present disclosure. The aforesaid storage medium includes a variety of mediums which can store program codes, such as a USB disk, a mobile hard disk, a read-only memory (ROM), a random access memory (RAM), a magnetic disk, or an optical disk.

The foregoing are merely detailed embodiments of the present disclosure, and the protection scope of the disclosure is not limited thereto. Any variations or replacement that can be readily thought of by persons skilled in the art within the technical scope disclosed by the present disclosure should be encompassed within the scope of the present disclosure. Therefore, the protection scope of the present disclosure should be determined according to the protection scope of the claims.

Respective aspects of the present disclosure recommend contents based on a user's feedback so that it is possible to perform reasonable and effective content recommendation for random users who have less click behaviors.

What is claimed is:

1. A method comprising:
    a server transmitting information to a client to recommend a content in a content set from a content pool to a user of the client based on an average recommendation probability determined by the server, the content pool including a plurality of content sets, a respective content set from the plurality of content sets containing contents of a corresponding type;
    the server receiving information from the client to collect feedback information on the recommended content from the client based on at least one of a frequency that represents a quantity of content interaction occurrences or a timing that represents times of the content interaction occurrences, the feedback information including display information and click information, the display information including displaying frequency and displaying timing of the recommended content on the client, the click information including clicking frequency and clicking timing of the recommended content on the client;

the server determining a sequence of preferred contents from contents in the content set according to the feedback information, the determining the sequence of the preferred contents from the contents in the content set according to the feedback information including performing a processing according to the feedback information of which the displaying timing and the clicking timing are within a predetermined time period, the processing including:

determining a first content having a highest attention degree among the contents of which displaying frequencies exceed a predetermined threshold, a respective attention degree being associated with a ratio of a respective clicking frequency to a respective displaying frequency of a respective content;

assigning a recommendation probability to one or more second contents of which displaying frequencies are less than the predetermined threshold;

determining a preferable recommendation probability based on the recommendation probability;

assigning the preferable recommendation probability to the first content; and selecting one content from the first content and the one or more second contents based on the recommendation probability and the preferable recommendation probability as a first preferred content in the sequence of preferred contents; and the server transmitting information to the client to recommend one or more contents to the user based on the sequence of preferred contents.

2. The method according to claim 1, wherein the determining the sequence of the preferred contents from the contents in the content set according to the feedback information further comprises:

re-determining recommendation probabilities of respective contents in the content set according to the feedback information; and determining the sequence of preferred contents based on the re-determined recommendation probabilities using a roulette wheel selection algorithm.

3. The method according to claim 1, wherein the recommendation probability is the average recommendation probability.

4. The method according to claim 1, wherein the recommendation probability is a compensatory recommendation probability of the content, the compensatory recommendation probability being obtained by subtracting an actual display probability of the content from the average recommendation probability.

5. The method according to claim 1, wherein the determining the sequence of the preferred contents from the contents in the content set according to the feedback information further comprises:

selecting a predetermined number of contents of which attention degrees are lower than the highest attention degree from contents of which displaying frequencies exceed the predetermined threshold, as candidate contents; and arranging the candidate contents after the first preferred content.

6. The method according to claim 1, wherein the selecting one content from the first content and the one or more second contents based on the recommendation probability and the preferable recommendation probability as a first preferred content in the sequence of preferred contents comprises selecting one content from the first content and the one or more second contents using a roulette wheel selection algorithm.

7. The method according to claim 1, further comprising creating the content pool.

8. The method according to claim 1, wherein the determining the preferable recommendation probability based on the recommendation probability comprising:

subtracting a sum of the recommendation probability of the one or more second contents from 1; and setting a result of the subtracting as the preferred recommendation probability.

9. A device comprising:

one or more processors; and one or more memories storing thereon computer operation instructions that, when executed by the one or more processors, cause the one or more processors to perform acts comprising:

transmitting information to a client to recommend a content in a content set from a content pool to a user of the client based on an average recommendation probability, the content pool including a plurality of content sets, a respective content set from the plurality of content sets containing contents of a corresponding type;

receiving information from the client to collect feedback information on the recommended content from the client based on at least one of a frequency that represents a quantity of content interaction occurrences or a timing that represents times of the content interaction occurrences, the feedback information including display information and click information, the display information including displaying frequency and displaying timing of the recommended content on the client, the click information including clicking frequency and clicking timing of the recommended content on the client;

determining a sequence of preferred contents from contents in the content set according to the feedback information, the determining the sequence of the preferred contents from the contents in the content set according to the feedback information including performing a processing according to the feedback information of which the displaying timing and the clicking timing are within a predetermined time period, the processing including:

determining a first content having a highest attention degree among the contents of which displaying frequencies exceed a predetermined threshold, a respective attention degree being associated with a ratio of a respective clicking frequency to a respective displaying frequency of a respective content;

assigning a recommendation probability to one or more second contents of which displaying frequencies are less than the predetermined threshold;

determining a preferable recommendation probability based on the recommendation probability;

assigning the preferable recommendation probability to the first content; and selecting one content from the first content and the one or more second contents based on the recommendation probability and the preferable recommendation probability as a first preferred content in the sequence of preferred contents; and transmitting information to the client to recommend one or more contents to the user based on the sequence of preferred contents.

10. The device according to claim 9, wherein the determining the sequence of the preferred contents from the contents in the content set according to the feedback information further comprises:
re-determining recommendation probabilities of respective contents in the content set according to the feedback information; and
determining the sequence of preferred contents based on the re-determined recommendation probabilities using a roulette wheel selection algorithm.

11. The device according to claim 9, wherein the recommendation probability is the average recommendation probability.

12. The device according to claim 9, wherein the recommendation probability is a compensatory recommendation probability of the content, the compensatory recommendation probability being obtained by subtracting an actual display probability of the content from the average recommendation probability.

13. The device according to claim 9, wherein the determining the sequence of the preferred contents from the contents in the content set according to the feedback information further comprises:
selecting a predetermined number of contents of which attention degrees are lower than the highest attention degree from contents of which displaying frequencies exceed the predetermined threshold, as candidate contents; and
arranging the candidate contents after the first preferred content.

14. The device according to claim 9, wherein the selecting one content from the first content and the one or more second contents based on the recommendation probability and the preferable recommendation probability as a first preferred content in the sequence of preferred contents comprises selecting one content from the first content and the one or more second contents using a roulette wheel selection algorithm.

15. The device according to claim 9, wherein the acts further comprise creating the content pool.

16. The device according to claim 9, wherein the determining the preferable recommendation probability based on the recommendation probability comprising:
subtracting a sum of the recommendation probability of the one or more second contents from 1; and
setting a result of the subtracting as the preferred recommendation probability.

17. A system comprising:
a server comprising:
one or more processors; and
one or more memories storing thereon computer operation instructions that, when executed by the one or more processors, cause the one or more processors to perform acts comprising:
transmitting information to a client to recommend a content in a content set from a content pool to a user of the client based on an average recommendation probability, the content pool including a plurality of content sets, a respective content set from the plurality of content sets containing contents of a corresponding type;
receiving information from the client to collect feedback information on the recommended content from the client based on at least one of a frequency that represents a quantity of content interaction occurrences or a timing that represents times of the content interaction occurrences, the feedback information including display information and click information, the display information including displaying frequency and displaying timing of the recommended content on the client, the click information including clicking frequency and clicking timing of the recommended content on the client;
determining a sequence of preferred contents from contents in the content set according to the feedback information, the determining the sequence of the preferred contents from the contents in the content set according to the feedback information including performing a processing according to the feedback information of which the displaying timing and the clicking timing are within a predetermined time period, the processing including:
determining a first content having a highest attention degree among the contents of which displaying frequencies exceed a predetermined threshold, a respective attention degree being associated with a ratio of a respective clicking frequency to a respective displaying frequency of a respective content;
assigning a recommendation probability to one or more second contents of which displaying frequencies are less than the predetermined threshold;
determining a preferable recommendation probability based on the recommendation probability;
assigning the preferable recommendation probability to the first content; and
selecting one content from the first content and the one or more second contents based on the recommendation probability and the preferable recommendation probability as a first preferred content in the sequence of preferred contents; and
transmitting information to the client to recommend one or more contents to the user based on the sequence of preferred contents.

18. The system according to claim 17, further comprising a client, the client comprising:
one or more processors; and
one or more memories storing thereon computer operation instructions that, when executed by the one or more processors, cause the one or more processors to perform acts comprising:
collecting the feedback information; and
transmitting the feedback information to the server.

19. The system according to claim 18, wherein the acts further comprise:
storing the sequence of preferred contents from the server; and
recommending the one or more contents to the user based on the sequence of preferred contents.

20. The system according to claim 19, wherein the recommending the one or more contents to the user based on the sequence of preferred contents comprises:
recommending multiple contents that are arranged at a front of the sequence of preferred contents and not included in a list of contents that have been recommended to the user, to the user; and
adding information of the recommended contents to the list of contents that have been recommended to the user.

* * * * *